Oct. 19, 1943.  H. S. MAGILL ET AL  2,332,158
COCKPIT ENCLOSURE FOR AIRPLANES
Filed Dec. 30, 1939  9 Sheets-Sheet 5
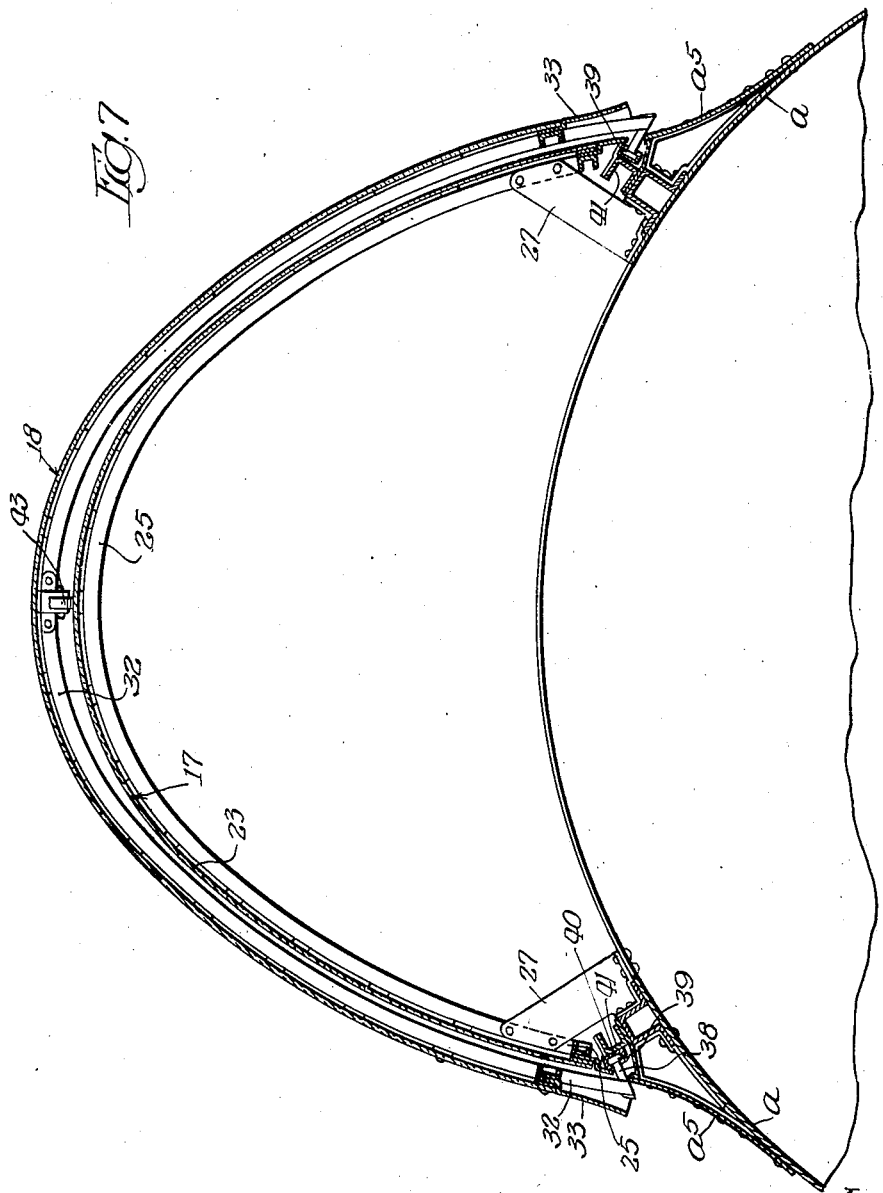

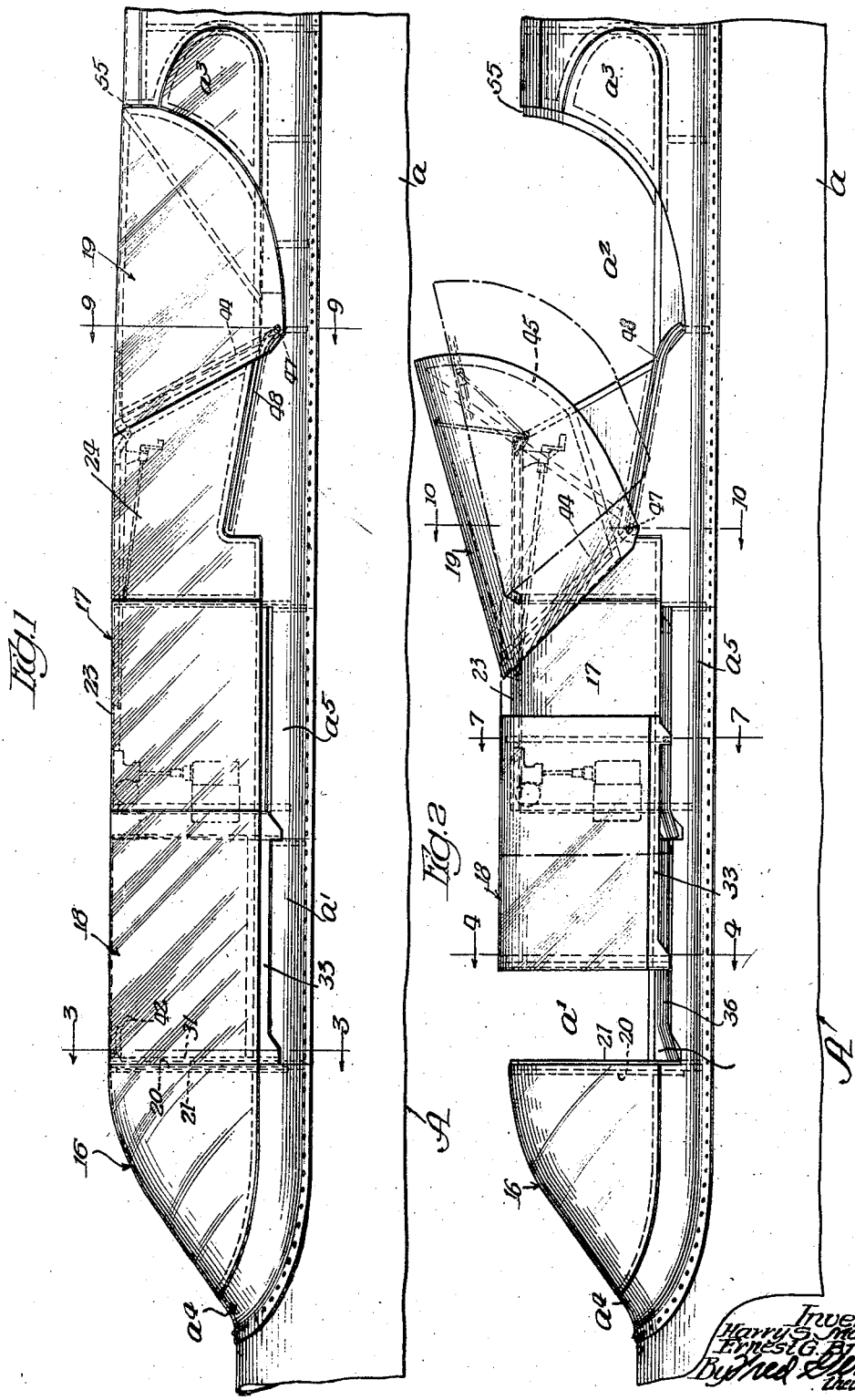

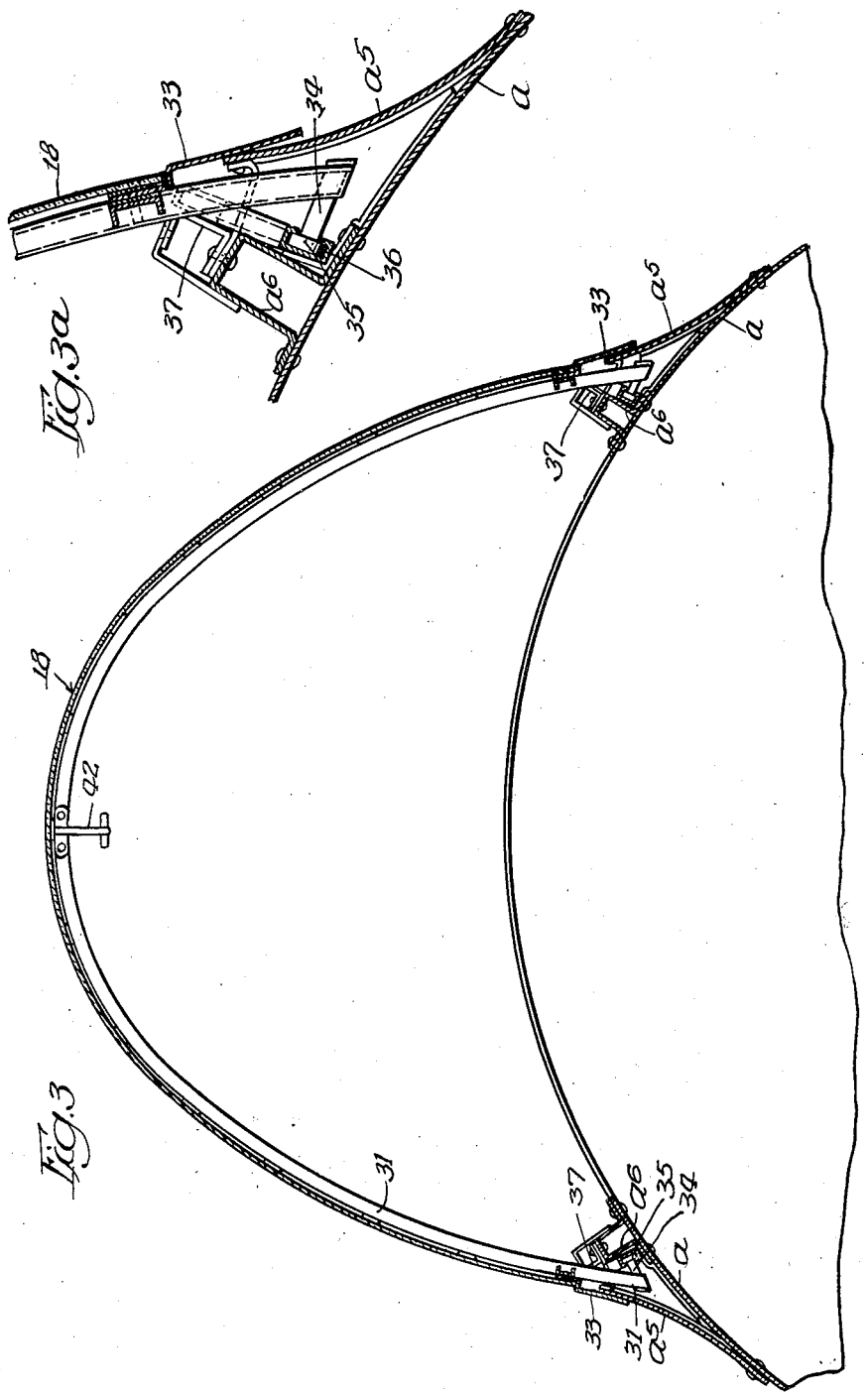

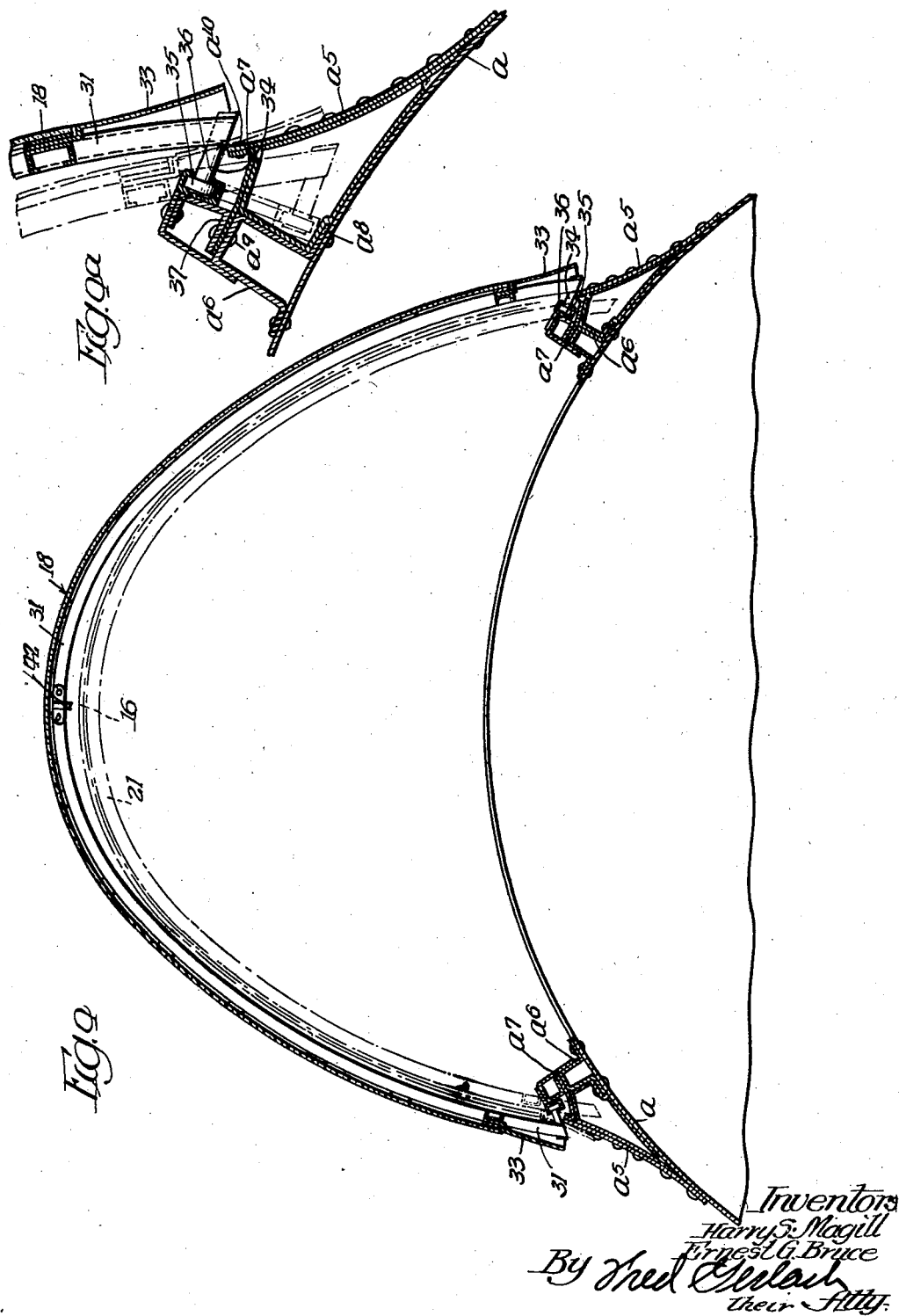

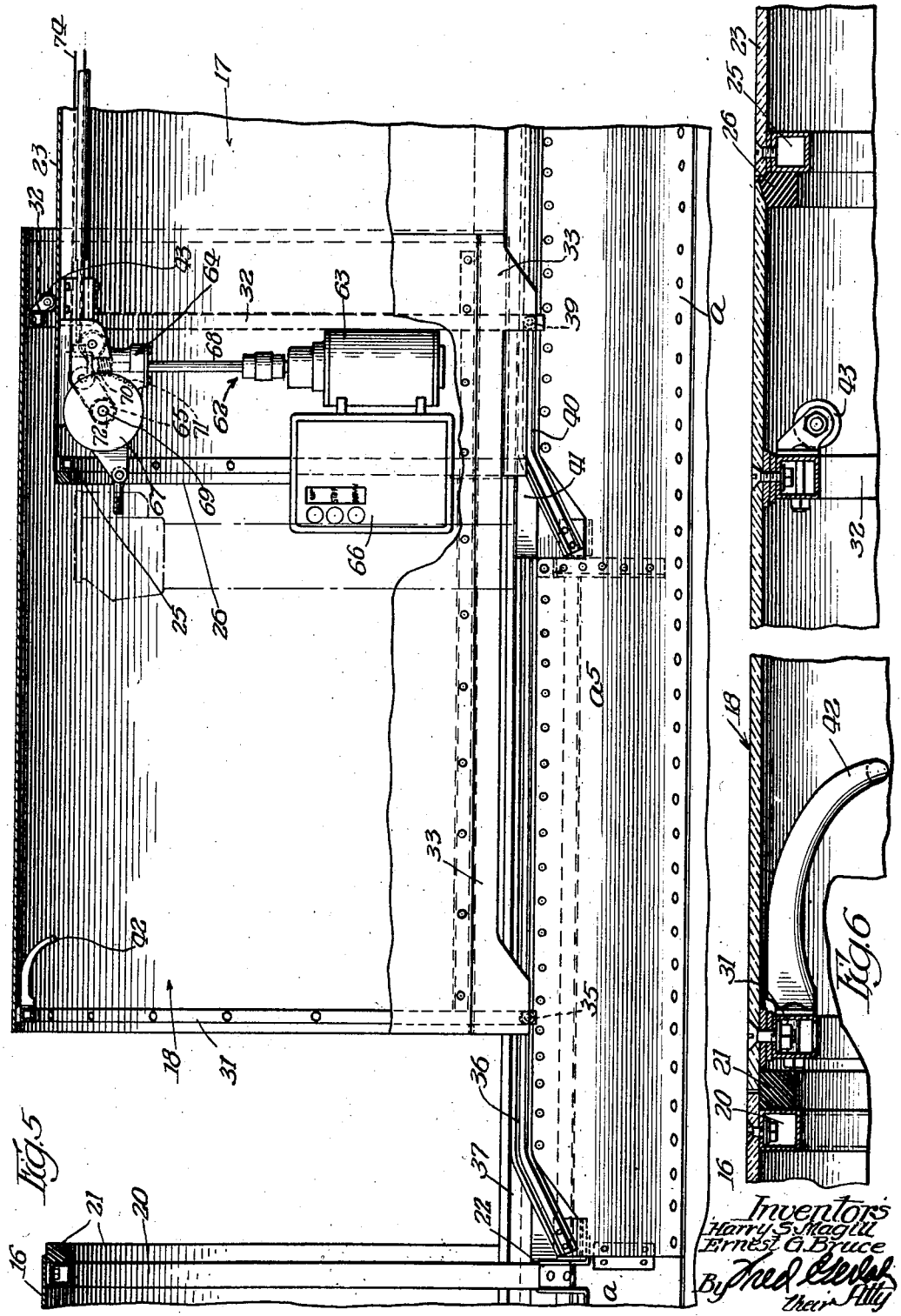

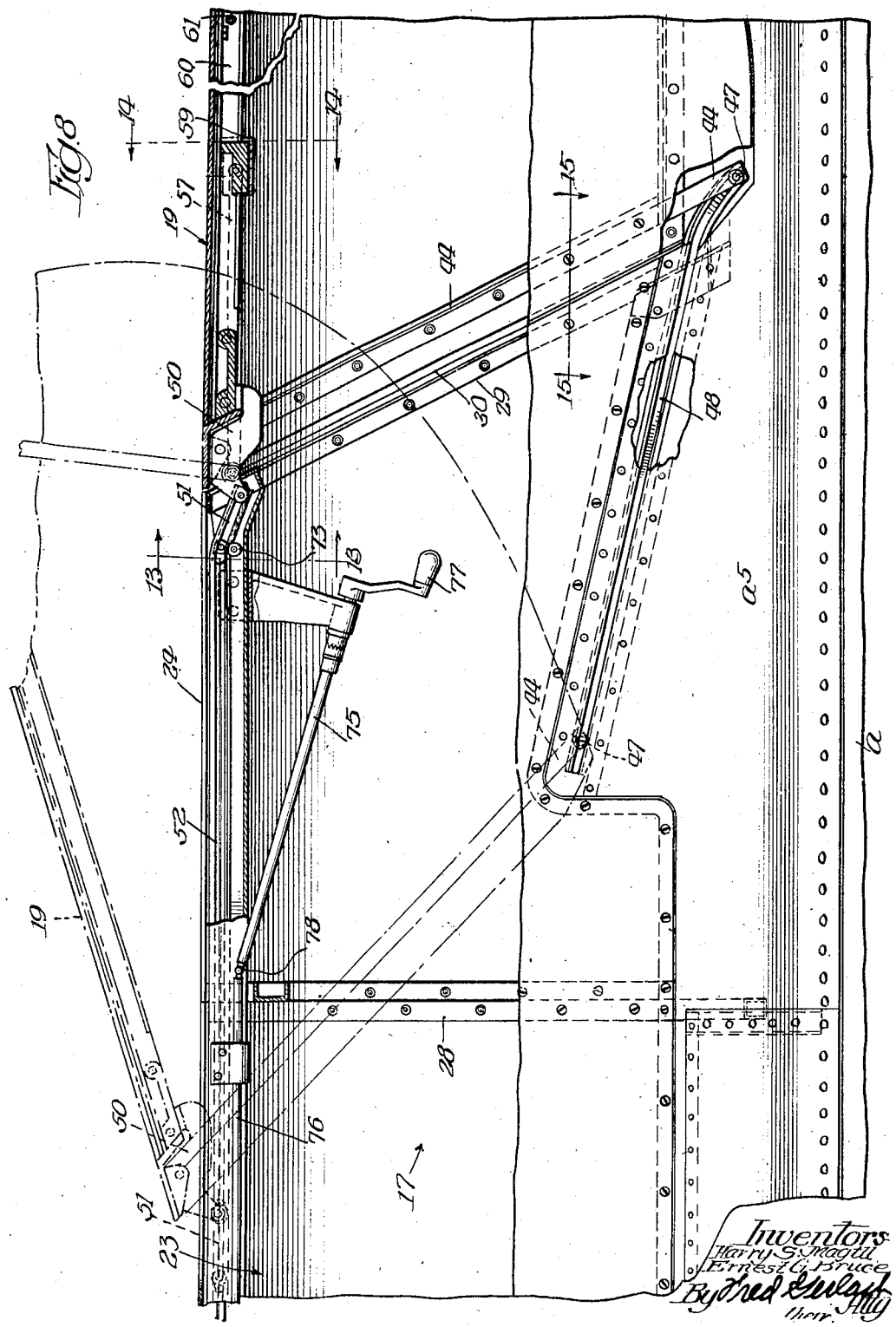

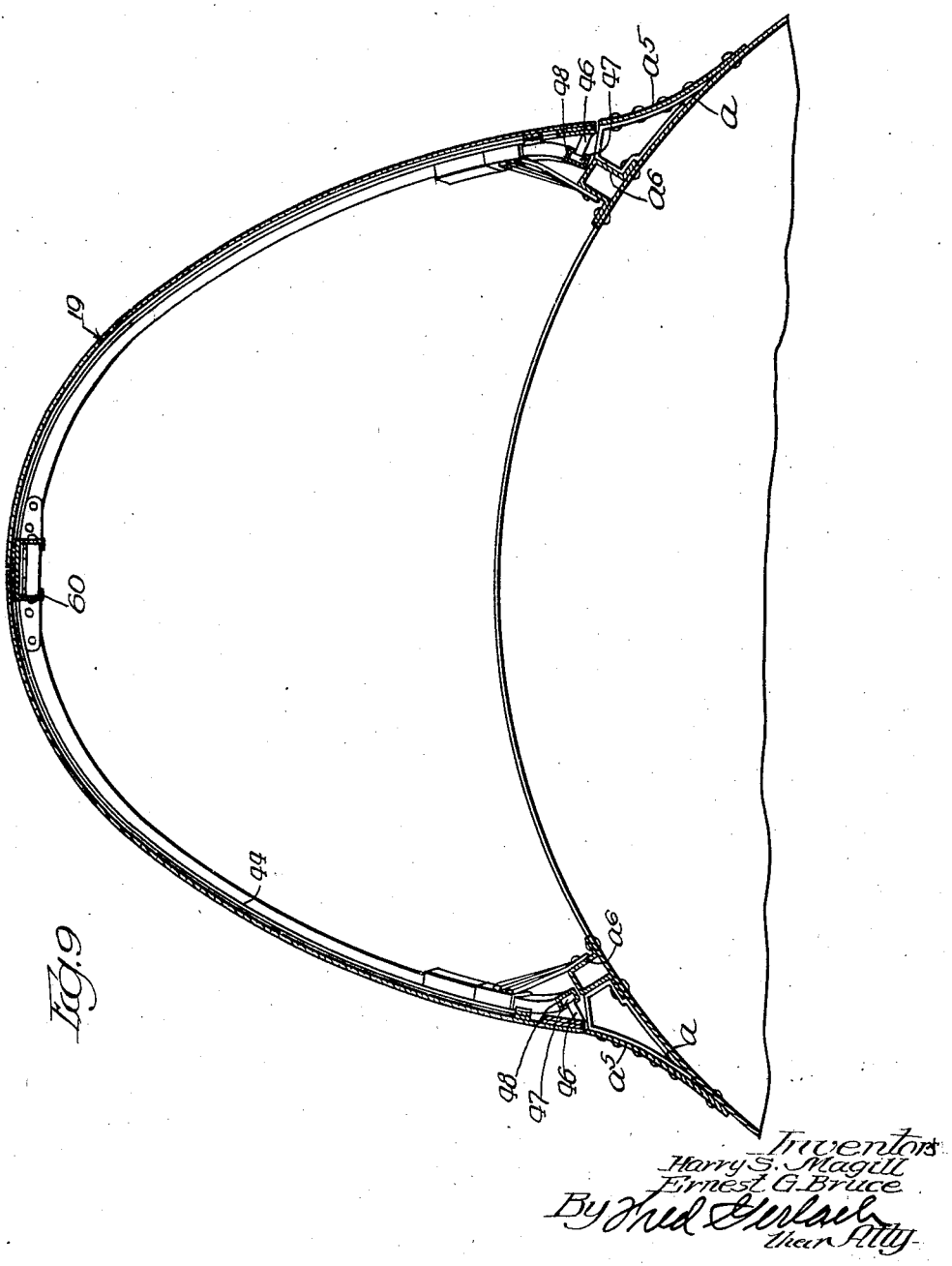

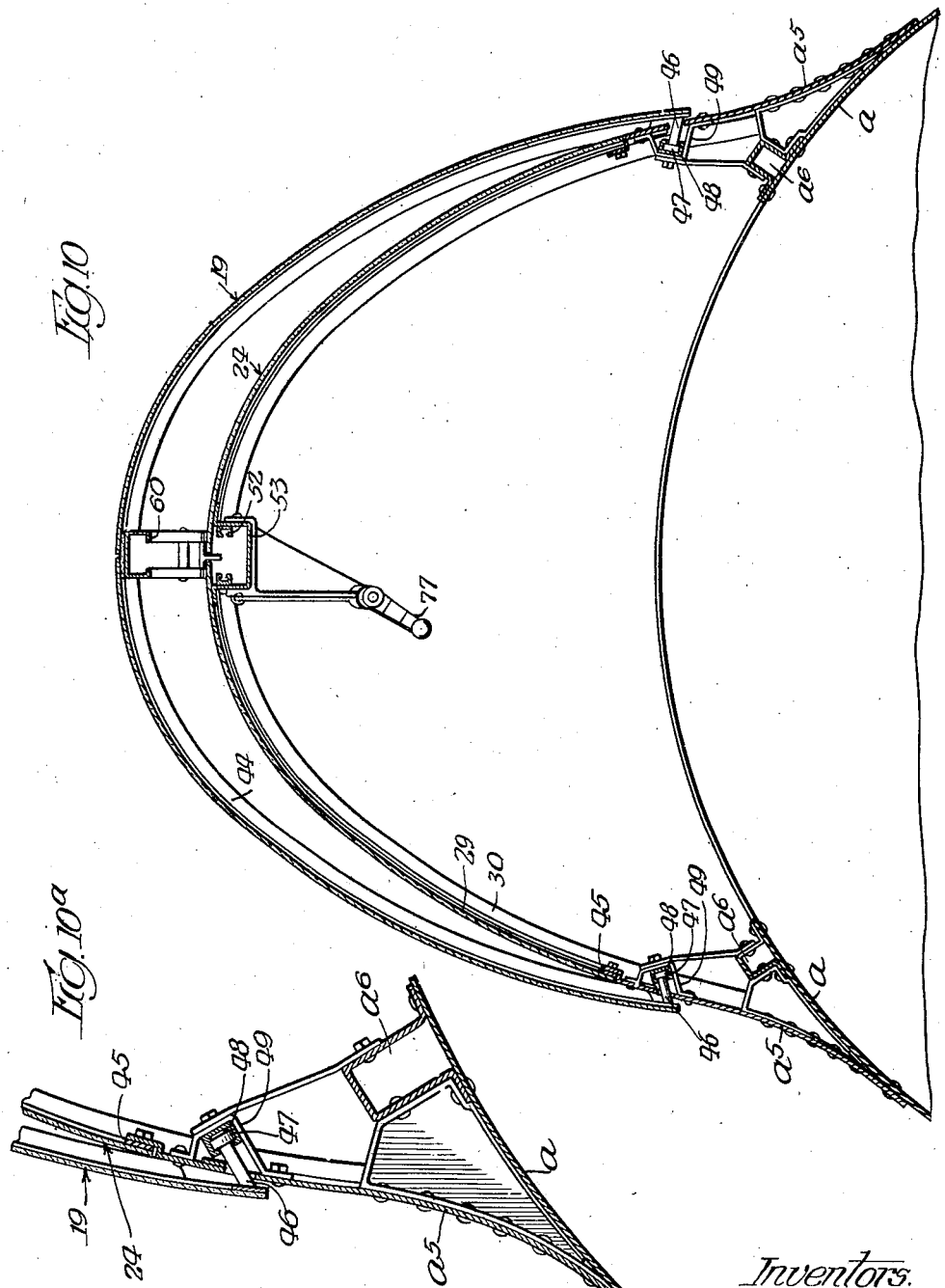

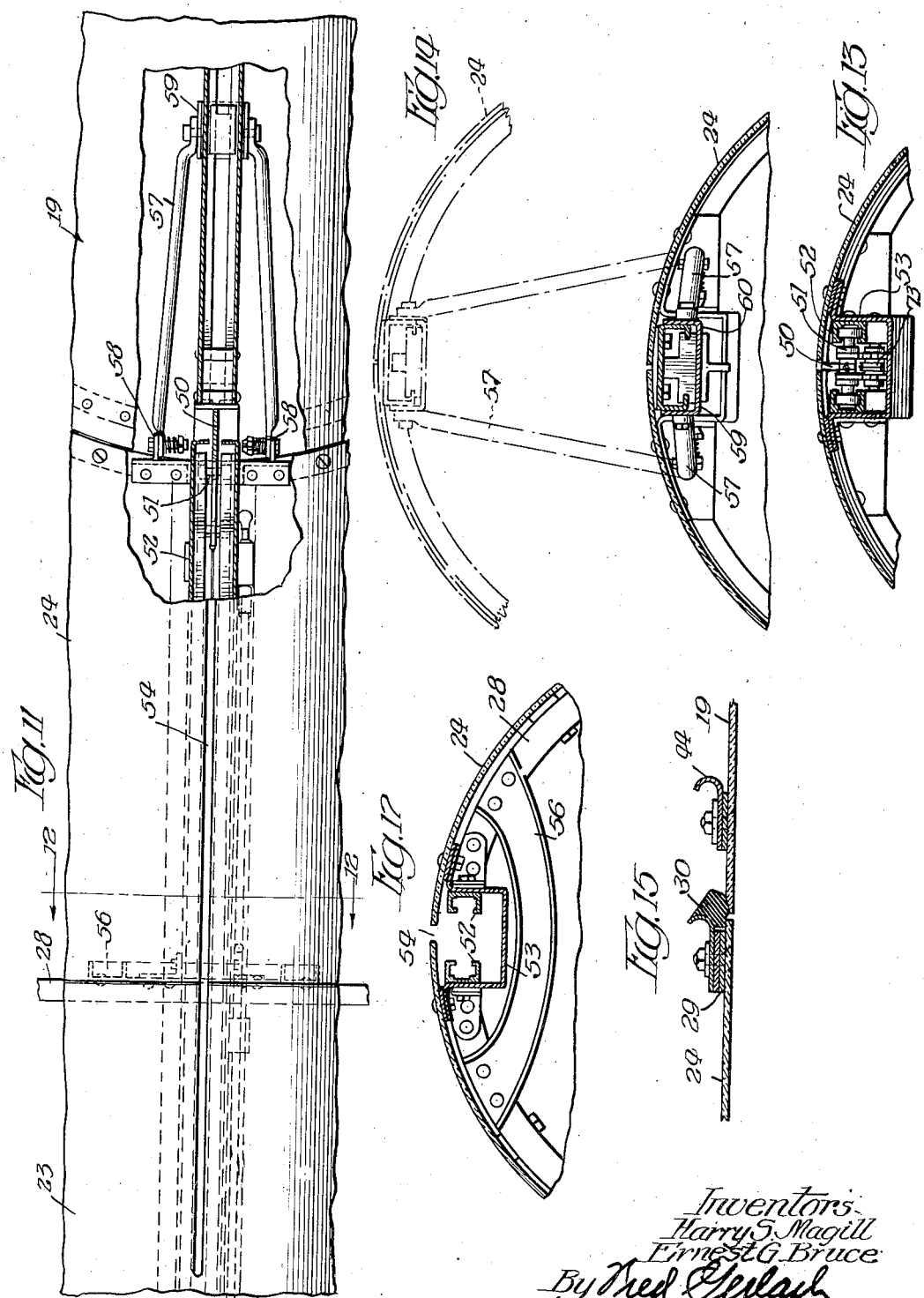

Patented Oct. 19, 1943

2,332,158

UNITED STATES PATENT OFFICE 2,332,158

COCKPIT ENCLOSURE FOR AIRPLANES

Harry S. Magill, Inglewood, and Ernest G. Bruce, Whittier, Calif., assignors to Vultee Aircraft, Inc., Downey, Calif., a corporation of Delaware Application December 30, 1939, Serial No. 311,710

13 Claims. (Cl. 244—121)

The present invention relates generally to cockpit enclosures for airplanes. More particularly the invention relates to that type of cockpit enclosure which is designed primarily for use with a military airplane having a pilot's cockpit in the front portion of the fuselage thereof and a gunner's cockpit behind the pilot's cockpit, and as its main parts comprises a dome shaped windshield in front of the pilot's cockpit and on the front part of the top of the fuselage, a fixed transparent canopy between the two cockpits and in substantial alignment with the windshield, a movable transparent hatch type closure member for the pilot's cockpit, and a movable transparent hatch type closure member over the gunner's cockpit and between the rear end of the fixed canopy and the part of the fuselage that is directly behind the gunner's cockpit.

It has heretofore been proposed in the manufacture or formation of a cockpit enclosure of this type to make the two closure members either larger or smaller in cross-section than the canopy and to mount them so that they are slidable longitudinally from their normal or closed position into an open position wherein they are in telescopic relation with the canopy. In practice it has been found that although an enclosure of the last mentioned character serves its intended purpose and permits of ready entry and exit of the pilot and gunner of the airplane with respect to their respective cockpits the enclosure as a whole has a stepped or irregular exterior which tends to produce drag and resultant decrease in speed when the airplane is in flight.

One object of the invention is to provide an airplane cockpit enclosure which is an improvement upon and eliminates the disadvantages of previously designed enclosures of the same general character by reason of the fact that the pilot's and gunner's closure members are of the same cross-section as the adjacent fixed parts of the enclosure when they are in their closed position and hence present no stepped formation or irregularities in the exterior of the enclosure, and are so designed and mounted that they are readily slidable longitudinally into and out of their closed position wherein they are in telescopic relation with the canopy.

Another object of the invention is to provide an airplane cockpit enclosure in which the two hatch type closure members are formed of flexible material and the mountings therefor are such that when the hatches are initially moved in connection with shift thereof into their open position they are raised and expanded and hence are readily adapted to telescope with the canopy, and are also such that at the end part of shift of the hatches into their closed position they cause the closure members to lower and contract in such manner that they are flush with and of the same cross-sectional shape as the adjacent fixed parts of the enclosure and form substantially airtight seals and butt joints with the latter.

Another object of the invention is to provide an airplane cockpit enclosure of the type and character under consideration in which the pilot's closure member is provided with simple means whereby when it is in its open position the trailing or rear portion thereof is supported against flexure or distortion by wind pressure or other force tending to flex or distort it and cause jamming of the mounting.

Another object of the invention is to provide an airplane cockpit enclosure of the aforementioned type in which the pilot's and gunner's closure members are so arranged, mounted, and positioned that when the gunner's closure member is in its fully opened position such member may be shifted or manipulated into a partially opened position by sliding the pilot's closure member rearwardly into its fully opened position.

Still another object of the invention is to provide an airplane cockpit enclosure in which the gunner's closure member is so mounted that when it is slid into its fully opened position the mounting means therefor causes it to swing upwards into a position wherein it serves as a windshield for the gunner.

A further object of the invention is to provide an airplane cockpit enclosure of the last mentioned character which includes a novel and simple form of stay whereby the rear or trailing portion of the gunner's closure member is efficiently and effectively supported against flexure by wind pressure or other force when such member is in its fully opened position.

A still further object of the invention is to provide an airplane cockpit enclosure which includes manually controllable power actuated mechanism for shifting or sliding the gunner's hatch type closure member back and forth between its open and closed positions.

In addition the invention contemplates as one of its objects the provision of an airplane cockpit enclosure which is generally of new and improved design and affords maximum visibility for the pilot and gunner of the airplane.

Other objects of the invention and the various advantages and characteristics of the present cockpit enclosure will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a side elevation of an airplane having applied to the fuselage thereof a cockpit enclosure embodying the invention, the pilot's and gunner's hatch type closure members of the enclosure being shown in their closed position;

Figure 2 is a similar side elevation showing the pilot's and gunner's closure members in their open position and illustrating in dotted lines the manner in which the pilot's closure member operates when shifted into its fully opened position to close partially the gunner's closure member;

Figure 3 is an enlarged vertical transverse section taken on the line 3—3 of Figure 1 and illustrating in detail the shape and design of the pilot's closure member of the enclosure and also the design, construction, and arrangement of the coacting rollers and tracks constituting the mountings or supporting means for the leading or front portion of such member;

Figure 3a is an enlarged section of one of the coacting rollers and tracks of Figure 3;

Figure 4 is an enlarged vertical transverse section taken on the line 4—4 of Figure 2 and showing the manner in which the coacting rollers and tracks for the leading or front portion of the pilot's member operate after initial shift of such member into its open position to raise and expand the member for telescopic relation with the fixed canopy;

Figure 4a is an enlarged section of one of the coacting rollers and tracks of Figure 4;

Figure 5 is an enlarged fragmentary side elevation of the pilot's closure member of the enclosure, parts being broken away and shown in longitudinal section for purposes of illustration;

Figure 6 is a fragmentary longitudinal section of the upper portion of the pilot's closure member, illustrating in detail the design and arrangement of the handle for shifting such member into and out of its closed position and also the design, construction and arrangement of the roller which constitutes the means whereby when the pilot's closure member is in its open position the trailing or rear portion of such member is supported against flexure or downward distortion by wind or other force;

Figure 7 is an enlarged vertical transverse section taken on the line 7—7 of Figure 2 and illustrating not only the design and arrangement of the coacting rollers and tracks constituting the mounting or supporting means for the trailing or rear portion of the pilot's closure member but also the manner in which such rollers and tracks coact to effect raising and expansion of the trailing portion of the pilot's member when such member is shifted rearwards into its open position;

Figure 8 is a side elevation of the rear portion of the fixed canopy and the front portion of the gunner's hatch type closure member, parts being broken away and shown in longitudinal section for purposes of illustration;

Figure 9 is an enlarged vertical transverse section taken on the line 9—9 of Figure 1 and illustrating the construction and design of the coacting rollers and tracks at the sides of the gunner's closure member;

Figure 10 is an enlarged vertical transverse section taken on the line 10—10 of Figure 2 and showing the manner in which the coacting rollers and tracks at the sides of the gunner's closure member operate to raise and expand the member when the latter is shifted forwards into its open position;

Figure 10a is an enlarged section of one of the coacting rollers and tracks of Figure 10;

Figure 11 is a fragmentary plan view of the top of the fixed canopy of the enclosure;

Figure 12 is a transverse section taken on the line 12—12 of Figure 11;

Figure 13 is a fragmentary vertical transverse section taken on the line 13—13 of Figure 8 and illustrating in detail the construction and design of the coacting rollers and track for controlling sliding movement of the top portion of the gunner's closure member;

Figure 14 is a vertical transverse section taken on the line 14—14 of Figure 8 and showing the design and arrangement of the sliding connection at the upper end of the stay for holding against flexure the upper or trailing portion of the gunner's closure member when such member is in its fully opened position; and Figure 15 is a horizontal section taken on the line 15—15 of Figure 8 and illustrating the manner in which the front edge of the gunner's closure member and the rear edge of the fixed canopy are sealed when the gunner's member is in its closed position.

The enclosure which is shown in the drawings constitutes the preferred embodiment of the invention and is primarily designed for use in connection with a military airplane A having an elongated fuselage $a$. The fuselage of the airplane is substantially cylindrical in shape and has in the front portion thereof a pilot's cockpit $a^1$ together with suitable control and operating mechanism (not shown). In addition to the pilot's cockpit $a^1$ the fuselage of the airplane A has a gunner's cockpit $a^2$. The latter is disposed behind the pilot's cockpit and is adapted to accommodate a gunner together with a machine gun or other armament, not shown. The upper rear portion of the fuselage projects above the upper central portion and defines the rear end of the gunner's cockpit $a^2$. It is arcuate in cross-section and has in the side portions thereof a pair of windows $a^3$. The latter are located immediately behind the gunner's cockpit and permit the gunner to view objects at the rear of the airplane as well as at the sides. The side portions of the front edge of the upper rear portion of the fuselage $a$ are substantially quadrantally curved for stream-lining and other purposes. The upper front and central portions of the fuselage $a$ of the airplane are provided with a U-shaped front fairing strip $a^4$ and a pair of side fairing strips $a^5$. The front fairing strip $a^4$ is suitably mounted on the upper front portion of the fuselage and is disposed in front of the pilot's cockpit $a^2$, as shown in Figures 1 and 2. It is arcuate or curved in cross-section and is arranged so that the ends thereof project rearwards and terminate adjacent the front of the pilot's cockpit $a^1$. The side fairing strips $a^5$ are arranged in parallel relation and extend along the upper central portion of the fuselage. They are arcuate or curved in cross-section and are arranged with the front ends thereof in abutment with the rear ends of the front fairing strip $a^4$. The rear ends of the strips $a^5$ join the front end of the upper rear portion of the fuselage at a point beneath the windows $a^3$. A pair of horizontally extending parallel, inverted channel beams $a^6$ and a pair of elongated plates $a^7$ serve to hold in place the side fairing strips $a^5$. The channel beams $a^6$ are suitably secured to the upper side parts of the central portion of the fuselage by means of out-turned rivet carrying flanges $a^8$ on the side legs thereof. The plates $a^7$ overlie and extend lengthwise of the channel beams $a^6$ and are arranged so that the inner margins thereof are in abutment with the cross-pieces of the channel beams $a^6$. Rivets $a^9$ extend through such margins of the plates $a^7$ and the cross-pieces of the channel beams and serve to hold the plates in connected or fixed relation with the beams. The outer margin of the plates $a^7$ are bent upwardly and inwardly and are connected by rivets $a^{10}$ to the upper margins of the side fairing strips $a^5$. The lower margins of the side fairing strips are riveted to the subjacent portions of the fuselage $a$. The enclosure overlies the front and side fairing strips and serves as a housing and protector medium for the pilot and gunner of the airplane A. It affords substantially unobstructed vision to the pilot and gunner, as hereinafter described, and consists of a windshield 16, a canopy 17, a pilot's hatch type closure member 18, and a gunner's hatch type closure member 19.

The windshield 16 is formed of any suitable tough transparent material such as "Plexiglass" and affords the pilot of the airplane forward vision. It is dome-shaped, as shown in Figures 1 and 2 and has a U-shaped bottom edge which is curved conformably to and abuts against the upper edge of the front U-shaped fairing strip $a^4$. The rear edge of the windshield is substantially semi-circular and is located in a vertical plane. It is coplanar with the end edges of the fairing strip $a^4$ and, as hereinafter described, is adapted to have the front edge of the pilot's closure member 18 abut against it when such member is in its closed position. A semi-circular hollow frame element 20 is disposed within and encircles the rear margin of the windshield and serves as a reinforcing medium. It is riveted or otherwise fixedly secured in place and is disposed slightly forwards of the rear edge of the windshield, as shown in Figure 5. A semi-circular sealing strip 21 of any suitable material fits against and is secured to the rear face of the frame element 20 and underlies and projects rearwardly of the rear edge of the windshield. The lower ends of the frame element 20 are secured by brackets 22 to the fuselage $a$.

The canopy 17, like the windshield 16, is fixed as far as the fuselage $a$ of the airplane is concerned. It extends over the part of the upper portion of the fuselage which is disposed between the pilot's cockpit $a^1$ and the gunner's cockpit $a^2$ and consists of a front section 23 and a rear section 24. The front section is semicylindrical and is formed of the same transparent material as the windshield 16 and has the front and rear edges thereof disposed or arranged in vertical planes. The lower or side edges of the section 23 overlie an dare substantially coplanar with the central portions of the upper margins of the side fairing strips $a^5$ and are straight, as shown in Figure 1. A semi-circular hollow frame element 25 underlies and surrounds the front margin of the section 23 of the canopy 17 and is provided on the front face thereof with a correspondingly shaped sealing strip 26. The lower ends of the element 25 are suitably secured by brackets 27 to the fuselage $a$ (see Figure 7). As shown in Figure 5, the frame element 25 is the same in size and is horizontally aligned with the frame element 20 at the rear end of the windshield and is substantially coplanar with the front edge of the section 23. The sealing strip 26 is suitably secured to the element 25 and projects forwardly of the front edge of said section 23. The rear margin of the canopy section 23 is supported and reinforced by a semi-circular hollow frame element 28. This element is the same in size as the element 25 and underlies, surrounds and is suitably secured to the rear margin of the section 23. The rear section 24 of the canopy is curved conformably to the section 23 and is arranged with the front edge thereof in abutment with the rear edge of the section 23. It is suitably held in fixed relation with the fuselage $a$ of the airplane A and is cut or designed so that the rear end thereof slopes downwardly and rearwardly. A semicircular metallic band 29 underlies and is suitably secured to the rear margin of the canopy section 24 and this band, as shown in Figure 15, carries a rearwardly extending sealing strip 30.

The pilot's hatch type closure member 18 is shaped and designed to fit normally in the space between the rear edge of the windshield 16 and the front edge of the front section 23 of the canopy 17 and serves as a removable closure for the pilot's cockpit $a^1$. It is formed for the most part of flexible transparent material such as "Plexiglass" and is adapted to be shifted rearwards into an open position wherein it is in telescopic relation with the front section 23 of the canopy as shown in Figure 2, and permits entry and exit of the pilot with respect to said cockpit $a^1$. As hereinafter described, the member 18 is adapted during the initial part of rearward shift thereof into its open position to be automatically and simultaneously raised and expanded in order to adapt it for proper telescopic relation with the section 23. In its closed position the closure member 18 is semicylindrical in cross-section and the front edge thereof is flush and in substantial abutment with the rear edge of the windshield and the rear edge thereof is flush and in substantial abutment with the front edge of the front canopy section 23. When the member is in its closed position, as shown in Figure 1, the sealing strip 21 underlies the front margin of the member and the sealing strip 26 underlies the rear margin of the member (see Figure 6). As the result of the fact that the exterior surface of the pilot's closure member 18 is flush with the adjoining surfaces of the windshield and the front canopy section 23 when the member is in its closed position, the exterior of the front portion of the enclosure presents no irregular surfaces or step formations and consequently drag and resultant decrease in speed of the airplane are avoided. The front and rear ends of the pilot's closure member 18 are reinforced by front and rear hollow semi-circular frame elements 31 and 32. These elements are sufficiently flexible so that they do not interfere with expansion and contraction of the closure member and carry at the lower ends thereof a pair of parallel horizontally extending metallic plates 33. The latter are disposed beneath the side edges of the member 18 and are adapted when the member is in its closed position to overlie and form continuations of the subjacent portions of the fairing strips $a^5$. The lower ends of the front frame element 31 are provided with a pair of upwardly and inwardly extending spindles 34. These spindles, as shown in Figures 3 and 3a carry rollers 35 at the inner ends thereof. The rollers, as shown in the drawings, fit within and are adapted to travel along a pair of laterally spaced channel type tracks 36 along the front side portions of the pilot's cockpit $a^1$. The tracks 36 are fixedly secured to the subjacent portions of the channel beams $a^6$ by horizontally elongated brackets 37 of C-shaped cross-section and are angularly arranged, as shown in Figures 3, 3a, 4 and 4a. The central and rear portions of the tracks 36 are straight and horizontal and the front ends of such tracks extend downwardly and inwardly. The lower ends of the rear frame element 32 are aligned with the lower ends of the front element 31 and carry a pair of spindles 38. The latter extend upwardly and inwardly, as shown in Figure 7, and carry at the inner ends thereof a pair of rollers 39 which fit within and are adapted to travel along a pair of channel tracks 40. The tracks 40 are positioned directly behind the tracks 36 and extend along the rear side portions of the pilot's cockpit $a^1$. They are disposed in laterally spaced relation and are secured to the subjacent portions of the channel beams $a^6$ by horizontally elongated brackets 41 of C-shaped cross-section. The central and rear portions of the tracks 40 are straight and in alignment with the central portions and rear ends of the tracks 36 and the front ends of the tracks 40 are bent downwardly and inwardly at the same angle as the front ends of said tracks 36. When the pilot's closure member 18 is in its closed position the rollers 35 are located in the front ends of the tracks 36 and the rollers 39 on the spindles 38 are located in the front ends of the tracks 40. During the initial part of rearward shift of the pilot's closure member into its open position, the rollers 35 and 39 travel upwardly and outwardly along the inwardly and downwardly inclined front portions of the two sets of tracks. As a result of such travel, the closure member 18 is caused automatically and simultaneously to raise and expand. As soon as the rollers 35 and 39 reach the horizontal portions of the tracks they serve during travel along such portions to guide the member 18 rectilinearly as it is further shifted into its open position. Because of the original raising and expansion of the pilot's closure member such member is in proper condition for sliding into telescopic relation with the fixed front canopy section 23 directly after initial rearward movement. When the member 18 is shifted forwards into its closed position it travels rectilinearly until the rollers 35 and 39 reach the downwardly and inwardly inclined front ends of the tracks 36 and 40. During travel of the rollers in the front ends of such tracks the closure member 18 is lowered and contracted and thus brought into proper seated relation with the windshield 16 and the front canopy section 23. The inner face of the rear margin of the member 18 is beveled or chamfered, as shown in Figure 6, in order that it readily clears the front edge of the canopy section 23 during the initial part of rearward shift of the pilot's closure member. When the member 18 is in its closed position, the plates 33 between the lower ends of the frame elements 31 and 32 cover the tracks 36, as shown in Figure 1. The horizontal portions or parts of the tracks 40 are disposed beneath the lower edges of the canopy section 23 and overlie the subjacent upper edge portions of the side fairing strips 5a. Suitable stops (not shown) are mounted in the rear ends of the tracks 36 and 40 and serve to limit or restrict rearward shift of the closure member 18. For purposes of shifting the member 18 into and out of its closed position, a handle 42 is provided. This handle is secured to the upper central portion of the hollow frame member 31.

Suitable latch means may, if desired, be employed to lock the pilot's closure member in its closed position. When the member 18 is shifted forwardly to its fullest extent the contraction due to travel of the rollers 35 and 39 in the front extremities of the tracks causes the front and rear margins of the closure member to be brought into sealed relation with the sealing strips 21 and 26. The member 18 may be shifted into and out of its open position during flight of the airplane A and affords the pilot substantially full or complete vision when it is in its closed position due to the fact there is no step formation between the front margin thereof and the rear margin of the windshield 16. The channel type tracks 36 and 40 are so formed or shaped that the rollers 35 and 39 are confined therein against lateral displacement. In order to prevent flexure or distortion of the rear portion of the pilot's closure member 18 and resultant jamming of the rollers 39 in the tracks 40 when the member is in its open position, a roller 43 is provided. This roller is suitably secured to the upper central portion of the frame element 32 and is adapted to ride or roll on the top central portion of the front section 23 of the fixed canopy 17. When the closure member 18 is in its partially opened position, the roller 43 rests on the section 23 and thus prevents downward flexure of the trailing portion of the member 18 as the result of wind pressure or other force. When the closure member is shifted forwards in connection with closing thereof the roller 43 passes over the front margin of the section 23 slightly before lowering and contraction of the member 18.

The hatch closure member 19 for the gunner's cockpit $a^2$ is formed of "Plexiglass" or like flexible transparent material. It is adapted to cover and form a closure medium for the cockpit $a^2$ and is further adapted to be slid forwardly and upwardly into an open position wherein it serves to form a windshield for the gunner and also provide access to the cockpit for entrance or exit of the gunner. The shape of the closure member 19 is such that when the member is in its closed position (see Figure 1) it extends between and abuts against the rear edge of the rear section 24 of the fixed canopy 17 and the front curved edge of the upper rear portion of the fuselage $a$, that is, the portion with the side windows $a^3$. In cross-section the closure member 19 is substantially semi-circular. The front of the member 19 is inclined forwardly and upwardly at such an angle that when the member is in its closed position the front edge thereof substantially abuts against the rear edge of the canopy section 24. The rear end of the closure member 19 is curved, as shown in Figures 1 and 2, and is adapted when the member is in its closed position to abut against the front edge of the upper rear portion of the fuselage. As hereinafter described, the closure member 19 is adapted during the initial part of shift thereof into its open position to be automatically and simultaneously raised and expanded in order to adapt it for telescopic relation with the fixed canopy 23. It is also adapted when moved or shifted rearwards into its closed position to be lowered and contracted as it reaches its closed position so that the exterior surface thereof is flush with the adjoining portions of the fixed canopy and the fuselage. Because the exterior surface of the gunner's closure member 19 is flush with such surfaces when the member is in its closed position, the rear portion of the enclosure embodies no step formations or other irregularities tending to produce drag and decreased speed during flight of the airplane A. The front margin of the closure member 19 is reinforced by a substantially semi-circular metallic band 44 which is riveted or otherwise fixedly secured in place and is spaced rearwardly a comparatively small distance from the front edge of the member. The rear and side margins of the member 19 are reinforced by a metallic strip 45 and this strip, as shown in Figure 2, is U-shaped and has the front ends thereof secured to the lower ends of the semi-circular band 44. The ends of the band 44 are provided with a pair of upwardly and inwardly extending spindles 46 and these spindles, as shown in Figures 9 and 10, carry at the inner ends thereof a pair of rollers 47. The latter are disposed within and are adapted to travel along a pair of upwardly and forwardly inclined channel type tracks 48. These tracks are positioned along the sides of the fuselage $a$ directly beneath the rear portion of the rear section 24 of the fixed canopy 17 and are secured by brackets 49 to the subjacent portions of the channel beams $a^6$. The central portions and front ends of the tracks 48 are straight and the rear ends of the tracks extend downwardly and inwardly, as shown in Figure 9. The upper central portion of the band 44 is provided with a forwardly and downwardly extending bracket 50, as shown in Figure 8. This bracket is pivotally connected to the rear end of a wheel equipped truck 51, as shown in Figures 8 and 13. The truck 51 is mounted for travel along a pair of opposed channel type tracks 52 under the top of the fixed canopy 24. The tracks 52 extend lengthwise of the enclosure and are carried by a channel beam 53. A longitudinally extending slot 54 is formed in the top portion of the canopy 17 directly over the channel beam 53 and this slot serves to accommodate the bracket 50 during shift of the gunner's closure member 19. The rear end of the tracks 52 are downwardly and rearwardly inclined, as shown in Figure 8. When the member 19 is in its closed position the truck 51 is disposed in the downwardly and rearwardly inclined rear ends of the tracks 52 and the rollers 47 are disposed in the lower extremities of the downwardly and inwardly inclined rear ends of the tracks 48. When the gunner's closure member 19 is shifted in connection with closing thereof it slides rearwards until the truck 51 reaches the downwardly and rearwardly inclined rear ends of the tracks 52 and the rollers 47 reach the downwardly and inwardly inclined rear ends of the tracks 48. As soon as the truck and rollers reach the rear ends of their respective tracks they are caused by the angularity of such ends to lower the closure member 19 and contract it. As a result of the lowering and contraction of the member 19 at the end of rearward shift thereof into its closed position, such member is brought into proper alignment with the adjacent portions of the fixed canopy 24 and the upper rear portion of the fuselage $a$. When the closure member 19 is in its closed position the front margin thereof is in sealed relation with the sealing strip 30 on the band 29, as shown in Figure 15, and the rear margin is in sealed relation with a sealing strip 55 around the front edge of the upper rear portion of the fuselage. When the member 19 is shifted forwards into its open position it is first simultaneously raised and expanded and then travels forwardly over the canopy section 24. Due to the inclination or angularity of the tracks 48 the member 19 is caused to swing upwards during forward travel thereof into a windshield forming position (see Figure 2). By having the member 19 tilt upwards into such a position when it is shifted forwards into its open position, the gunner in the cockpit $a^2$ is adequately protected from air-blasts and is hence capable of manipulating his machine gun or other armament while the airplane A is in flight. When the gunner's closure member 19 is shifted rearwards into its closed position it is automatically swung downwards out of its windshield forming position as the result of the coaction of the rollers 47 and the tracks 48. The truck 51 and the tracks 52 serve to guide the upper front portion of the gunner's hatch rectilinearly during the latter portion of forward shift of the member 19 into its open position and during the initial portion of rearward shift of such member into its closed position. The rollers 47 and the tracks 48 exemplify means for automatically causing the closure member 19 to swing upwards into a windshield forming position when it is shifted into its fully opened position and to swing the member downwards out of such position during closing of the said member. As shown in Figure 12, the frame element 28 is slit or cut-away at the top portion thereof in order to accommodate the channel beam 53 and the sections thereof are connected together by way of a reinforcing strip 56.

In order to brace or strut the trailing or rear portion of the gunner's closure member 19 against downward flexure or distortion due to air pressure or other force when the member is in its fully opened position, a U-shaped or bail-like stay 57 is provided. The free ends of the legs of this stay are pivotally connected to a pair of brackets 58 on the upper or central portion of the band 29 and the cross-piece of the stay is pivotally connected to a slide block 59. The block 59 is slidably mounted in a longitudinally extending slideway 60 which is fixed to and extends along the bottom face of the top portion of the closure member 19. When the member 19 is in its closed position, the stay 57 extends rearwardly and assumes a substantially horizontal position, as shown in Figure 8. When the closure member 19 is slid forwardly into its open position the stay swings upwardly due to sliding of the slide block with respect to the slideway 60. A stop 61 is fixed to the rear end of the slideway 60 and is adapted to have the slide block 59 abut against it when the member 19 is in its fully opened position. As a result of abutment of the slide block with the stop and the specific angular position of the stay 57 the trailing or rear portion of the gunner's closure member 19 is effectively struted against downward flexure when the member is in its fully open position. When the member 19 is shifted into its closed position the slide block 59 slides with respect to the slideway 60 and the stay 57 swings downwardly.

For the purpose of shifting the gunner's hatch type closure member 19 back and forth between its closed and open positions, a mechanism 62 is provided. This mechanism comprises a reversible electric motor 63, a speed reducer 64, and a cable and sheave connection 65.

The electric motor 63 is located under the front section 23 of the fixed canopy 17 and is supplied with current from the battery or generator apparatus of the airplane A. It is positioned so that the armature shaft thereof extends vertically and is controlled by a switch box 66. The latter is within reach and under the control of the pilot of the airplane and has a stop button and also buttons for effecting drive of the motor in either direction. The speed reducer 64 is suitably secured or mounted under the front upper portion of the canopy section 23 and comprises a casing 67, a drive shaft 68, and a driven shaft 69. The drive shaft is journaled in suitable bearings in the casing and extends vertically. It is aligned with and coupled for drive by the armature shaft of the reversible electric motor 62 and carries a worm 70. The driven shaft is horizontally positioned and extends through and is journaled in suitable bearings in the casing 67. A worm wheel 71 is fixed to the driven shaft 69 and is in mesh with the worm 70 with the result that the driven shaft is driven in one direction when the electric motor is driven in one direction, and is driven in the reverse direction when the motor is reversely driven. The cable and sheave connection 65 comprises a sheave 72 on the driven shaft 69 of the speed reducer 64, a sheave 73 adjacent the rear ends of the tracks 52, and a cable 74. The cable extends around the two sheaves and is connected at the ends thereof to the truck 51. As the result of the arrangement of the cable and sheave connection, the gunner's closure member 19 is caused to slide forwards into its open position when the electric motor 63 is driven in one direction, and is caused to slide rearwards into its closed position when the motor is driven in the opposite or reverse direction. By having the switch box 66 located directly behind the pilot's cockpit $a^1$ the pilot is able to effect opening and closing of the gunner's closure member 19. Opening and closing of such member from the cockpit $a^2$ is effected by means of a pair of shafts 75 and 76. The shaft 75 extends lengthwise of the enclosure and is journaled in suitable bearing brackets under the upper or top portion of the rear canopy section 24. A crank 77 on the rear end of the shaft 75 and in the front portion of the gunner's cockpit $a^2$ permits the shaft 75 to be rotated by the gunner of the airplane. The shaft 76 extends lengthwise of the enclosure and is disposed under the top portion of the front canopy section 23. The rear end of the shaft 76 is connected by a universal joint 78 to the front end of the shaft 75, and the front end of the shaft 76 is connected by a pair of bevel gears to the drive shaft 68 of the speed reducer 64. When the shafts 75 and 76 are rotated in one direction as the result of turning of the crank 77, the speed reducer is driven so as to cause opening of the gunner's hatch 19. When the shafts are reversely rotated by a reverse turning of the crank, the speed reducer is reversely driven and operates to close the hatch 19. The mechanism 62 constitutes power actuated means under the control of the pilot for opening and closing the gunner's closure member 19 and the shafts 75 and 76 together with the speed reducer 64 of the mechanism 62 constitute manual means for opening and closing the closure member 19 from the gunner's cockpit $a^2$. The cable 74 of the cable and sheave connection 65 extends loosely around the two sheaves 72 and 73, and as a result it is possible to shift the gunner's closure member 19 without actuating the speed reducer 64 either by the electric motor 63 or the two shafts 75 and 76. When the pilot's closure member 18 is in its fully opened position, the rear end thereof is substantially flush with the rear end of the front section 23 of the fixed canopy 17 and when the gunner's closure member 19 is in its fully open position the upper portion of the front end thereof is disposed substantially midway between the front and rear ends of said section 23. As a result of this arrangement it is possible for the pilot partially to close the gunner's closure member 19 by merely shifting the closure member 18 rearwards into its fully opened position. In the event that the gunner's closure member 19 is in its fully opened position and the pilot is desirous of partially closing such member but is unable to work the mechanism 62, it is only necessary for him to shift his closure member 18 rearwards into its fully opened position. During initial rearward movement of the pilot's closure member, the rear end of such member is brought into abutment with the bracket 50 and during the remainder of rearward shift of the pilot's closure member into its fully open position such member operates to shift the gunner's closure member rearwards into a partially closed position, as shown by dotted lines in Figure 2.

The herein described enclosure effectively and efficiently fulfills its intended purpose and affords maximum vision to the pilot and gunner of the airplane with which it is associated. It affords a smooth exterior surface when the two hatch type closure members are closed and hence produces but a minimum amount of drag during flight of the airplane. As a result of the specific mounting of the two closure members it is possible quickly and readily to open the members for emergency or other purposes.

Whereas the enclosure has been described in connection with a military airplane it is to be understood that it may be used or employed in connection with any other type of airplane. It is also to be understood that the invention is not to be restricted to the details set forth, since these may be modified within the scope of the appended claims, without departing from the spirit and scope of the invention.

Having thus described the invention, what we claim as new and desire to secure by Letters Patent is:

1. In combination with a vehicle having a cockpit therein, an enclosure for the cockpit comprising an arched part mounted fixedly on the vehicle adjacent the cockpit, an arched transversely flexible hatch type closure member having normally the same cross-sectional shape as the cockpit facing portion of the fixed part and adapted normally to assume a closed position wherein it overlies the cockpit and is aligned and in butt relation with said part and further adapted to be shifted back and forth between its closed position and an open position wherein it is in telescopic relation with said fixed part, and a mounting for the closure member including means whereby the member is caused during the initial part of shift thereof into its open position to be moved transversely of the fixed part and at the same time flexed into a different cross-sectional shape for purposes of telescopic relation with said fixed part and is caused during the end part of shift into its closed position to be moved transversely in the opposite direction into alignment with said fixed part and at the same time flexed into its normal cross-sectional shape.

2. In combination with a vehicle having a cockpit therein, an enclosure for the cockpit comprising an arched fixed part in front of the cockpit and an arched fixed part behind the cockpit and in alignment with the first mentioned part, an arched transversely flexible hatch type closure member having normally the same cross-sectional shape as the cockpit facing portions of the two fixed parts and adapted normally to assume a closed position wherein it fits between and has butt relation with the two parts and further adapted to be shifted back and forth between its closed position and an open position wherein it is in telescopic relation with one of the parts, and a mounting for the closure member including means whereby said member is caused during the initial part of shift thereof into its open position to be moved transversely of said one part and at the same time flexed into a different cross-sectional shape for purposes of telescopic relation with said one part and is caused during the end part of shift into its closed position to be moved transversely in the opposite direction into alignment with said one part and at the same time flexed into its normal cross-sectional shape.

3. In combination with a vehicle having a cockpit therein, a closure for the cockpit comprising a transversely arched part mounted fixedly on the vehicle adjacent the cockpit, a transversely arched and expansible and contractible hatch type closure means having normally the same cross-sectional shape as the cockpit portion of the fixed part and adapted normally to assume a closed position wherein it overlies the cockpit and is aligned and in butt relation with the cockpit facing portion of the fixed part and further adapted to be shifted back and forth between its closed position and an open position wherein it overlies and is in telescopic relation with said fixed part, and a mounting for the closure member including means whereby said member is caused during the initial part of shift thereof into its open position to be raised with respect to the fixed part and at the same time expanded for purposes of telescopic relation with said fixed part, and is caused during the end part of shift into its closed position to be lowered into alignment with said fixed part and at the same time contracted into its normal cross-sectional shape.

4. In combination with a vehicle having a cockpit therein, an enclosure for the cockpit comprising a dome-shaped windshield part positioned in front of the cockpit and provided with an arched rear margin, a fixed arched canopy part positioned behind the cockpit and in alignment with the windshield part and having the same cross-sectional shape as the rear margin of said windshield part, an arched transversely flexible hatch type closure member having normally the same cross-sectional shape as the canopy part and the rear margin of the windshield part, and adapted normally to assume a closed position wherein it overlies the cockpit and fits between and has butt relation with the canopy part and said rear margin of the windshield part, and further adapted to be shifted back and forth between its closed position and an open position wherein it is in telescopic relation with one of the parts, and a mounting for the closure member including means whereby said member is caused during the initial part of shift thereof into its open position to be moved transversely and at the same time flexed into a different cross-sectional shape for purposes of telescopic relation with said one part, and is caused during the end part of shift into its closed position to be moved transversely in the opposite direction into alignment with the two parts and at the same time flexed into its normal cross-sectional shape.

5. In combination with a vehicle having a cockpit therein, an enclosure for the cockpit comprising a dome-like windshield part positioned in front of the cockpit and having the rear margin thereof arched, a transversely arched canopy part positioned behind the cockpit and in alignment with the windshield part and having the same cross-sectional shape as the rear margin of the windshield part, an arched transversely expansible and contractible hatch type closure member having normally the same cross-sectional shape as the canopy part and the rear margin of the windshield part and adapted normally to assume a closed position wherein it overlies the cockpit and fits between and has butt relation with the canopy part and said rear margin of the windshield part and further adapted to be shifted back and forth between its closed position and an open position wherein it overlies and is in telescopic relation with the canopy part, and a mounting for the closure member including means whereby said member is caused during the initial part of shift thereof into its open position to be raised and at the same time expanded for purposes of telescopic relation with the canopy part and is caused during the end part of shift into its closed position to be lowered into alignment with the two parts and at the same time contracted into its normal cross-sectional shape.

6. In combination with a vehicle having a cockpit therein, a closure for the cockpit comprising an arched part mounted fixedly on the vehicle adjacent the cockpit, an arched transversely flexible hatch type closure member having normally the same cross-sectional shape as the cockpit facing portion of the fixed part and adapted normally to assume a closed position wherein it overlies the cockpit and is aligned and in butt relation with said part and further adapted to be shifted back and forth between its closed position and an open position wherein it is in telescopic relation with said fixed part, and a mounting for the closure member designed and arranged so that when said member is shifted into its open position it is first moved transversely of the fixed part and at the same time flexed into a different cross-sectional shape for purpose of telescopic relation with said fixed part and is then limited to rectilinear movement and when the hatch is shifted into its closed position it is first guided rectilinearly and is then and finally moved transversely in the opposite direction into alignment with the fixed part and at the same time flexed into its normal cross-sectional shape.

7. In combination with a vehicle having a cockpit therein, a closure for the cockpit comprising an arched part mounted fixedly on the vehicle adjacent the cockpit, an arched transversely flexible hatch type closure member having normally the same cross-sectional shape as the cockpit facing portion of the fixed part and adapted normally to assume a closed position wherein it overlies the cockpit and is aligned and in butt relation with said part and further adapted to be shifted back and forth between its closed position and an open position wherein it is in telescopic relation with said fixed part, and a mounting for the closure member consisting of rollers on said member and tracks along the cockpit adapted to have the rollers travel therealong and provided with angular parts whereby the member is caused during the initial part of shift thereof into its open position to be moved transversely of the fixed part and at the same time flexed into a different cross-sectional shape for purposes of telescopic relation with said fixed part, and is caused during the end part of shift into its closed position to be moved transversely in the opposite direction into alignment with said fixed part and at the same time flexed into its normal cross-sectional shape.

8. In combination with a vehicle having a cockpit therein, a closure for the cockpit comprising an arched windshield in front of the cockpit and a transversely curved canopy behind the cockpit, a transversely curved and expansible and collapsible hatch type closure member having normally the same cross-sectional shape as the canopy and adapted normally to assume a closed position wherein it overlies the cockpit and has butt relation with the canopy and further adapted to be shifted back and forth between its closed position and an open position wherein it overlies and is in telescopic relation with the canopy, a mounting for the closure member including means whereby said member is caused during initial part of shift thereof into its open position to be raised and at the same time expanded for purposes of telescopic relation with the canopy and is caused during the end part of shift into its closed position to be lowered into alignment with said canopy and at the same time contracted into its normal cross-sectional shape, and a depending roller mounted on the upper rear portion of the closure member and adapted when the member is in its open position to rest on the subjacent portion of the canopy and prevent flexure of said rear portion of the closure member.

9. In combination with a vehicle having a cockpit therein, an enclosure for the cockpit comprising an arched fixed part in front of the cockpit, an arched hatch type closure member adapted normally to assume a closed position wherein it overlies the cockpit and is in alignment with the fixed part and further adapted to be shifted back and forth between its closed position and an open position wherein it overlies said fixed part, and a mounting for the closure member including rollers on said member and fixed tracks along which the rollers travel during shift of the member between its open and closed positions, certain of the tracks being so angularly disposed that the member during forward shift thereof into its open position is swung upwards for windshield forming purposes and during rearward shift into its closed position is swung downwards.

10. In combination with a vehicle having a cockpit therein, an enclosure for the cockpit comprising an arched part fixed in front of the cockpit, an arched hatch type closure member adapted normally to assume a closed position wherein it overlies the cockpit and is in substantial alignment with the fixed part and further adapted to be shifted back and forth between its closed position and an open position wherein it is disposed forwardly of the cockpit and overlies said fixed part, and a mounting for the closure member including a roller on the upper forward portion of the member and a longitudinally extending track for the roller on the upper portion of the fixed part and also including a roller on one of the side portions of the closure member and a track for the last mentioned roller so angularly disposed with respect to the first mentioned track that the member is caused to swing upwards for windshield forming purposes when it is shifted forwards into its open position and is caused to swing downwards in connection with rearward shift of the member into its closed position.

11. In combination with a vehicle having a cockpit therein, an enclosure for the cockpit comprising an arched part mounted fixedly on the vehicle in front of the cockpit, a transversely arched expansible and contractible hatch type closure member having normally the same cross-sectional shape as the arched part and adapted normally to assume a closed position wherein it overlies the cockpit and is aligned and in butt relation with the fixed part and further adapted to be shifted back and forth between its closed position and an open position wherein it overlies and is in telescopic relation with said fixed part, and a mounting for the closure member including means whereby said member is caused during the initial part of forward shift thereof into its open position to be raised and at the same time expanded for purposes of telescopic relation with said fixed part and is caused during the end part of shift into its closed position to be lowered into alignment with said fixed part and at the same time contracted into its normal cross-sectional shape, and also including means whereby the closure member is caused automatically to swing upwards for windshield forming purposes after initial shift into its open position and is caused to swing downwards during rearward shift into its closed position.

12. In combination with a vehicle having a cockpit therein, an enclosure for the cockpit comprising an arched part mounted fixedly on the vehicle in front of the cockpit, a transversely arched expansible and contractible hatch type closure member having normally the same cross-sectional shape as the arched part and adapted normally to assume a closed position wherein it overlies the cockpit and is aligned and in butt relation with the fixed part and further adapted to be shifted back and forth between its closed position and an open position wherein it overlies and is in telescopic relation with said fixed part, a mounting for the closure member including means whereby said member is caused during the initial part of forward shift thereof into its open position to be raised and at the same time expanded for purposes of telescopic relation with said fixed part and is caused during the end part of shift into its closed position to be lowered into alignment with said fixed part and at the same time contracted into its normal cross-sectional shape, and also including means whereby the member is caused automatically to swing upwards for windshield forming purposes after initial shift into its open position and is caused to swing downwards during rearward shift into its closed position, and stay means between the vehicle and the closure member for strutting or bracing the rear end of the member when said member is in its fully open position.

13. In an airplane the combination of a fuselage provided with a curved wall having an access opening therein, a curved closure member normally fitting in said opening with its edges aligned with the wall of the fuselage, said member being slidably mounted on the fuselage so that it is shiftable into an open position wherein it is in telescopic relation with said wall and being flexible for variation of its curvature, and means for automatically varying the curvature of said member as it is shifted from its closed position into its open position.

HARRY S. MAGILL.
ERNEST G. BRUCE.